United States Patent [19]

Cox

[11] Patent Number: 5,034,378
[45] Date of Patent: Jul. 23, 1991

[54] SYNERGISTIC FLAVOR ENHANCEMENT NUTRITIONAL COMPOSITIONS AND METHODS

[75] Inventor: James P. Cox, 246 E. Bartlett Rd., Lynden, Wash. 98264

[73] Assignee: James P. Cox, Lynden, Wash.

[21] Appl. No.: 285,192

[22] Filed: Dec. 15, 1988

[51] Int. Cl.5 .............................................. A23L 1/237
[52] U.S. Cl. ...................................... 514/23; 514/55; 514/59; 514/892; 426/804; 426/806; 424/439
[58] Field of Search ................ 426/804, 806; 514/892, 514/23, 59, 55; 424/439

[56] References Cited

U.S. PATENT DOCUMENTS

| | | | |
|---|---|---|---|
| 3,476,565 | 11/1969 | Anderson et al. | 426/806 |
| 3,914,439 | 10/1975 | Graves | 426/289 |
| 4,068,006 | 1/1978 | Moritz | 426/806 |
| 4,297,375 | 10/1981 | Shackelford | 426/649 |
| 4,362,748 | 12/1982 | Cox | 426/806 |
| 4,747,881 | 5/1988 | Shaw et al. | 426/804 |
| 4,766,004 | 8/1988 | Moskowitz | 426/618 |
| 4,784,861 | 11/1988 | Gori | 426/804 |
| 4,833,128 | 5/1989 | Solomon | 426/804 |
| 4,844,936 | 7/1989 | Cox | 426/618 |
| 4,935,250 | 6/1990 | Cox | 426/303 |

Primary Examiner—Ronald W. Griffin
Attorney, Agent, or Firm—Kenyon & Kenyon

[57] ABSTRACT

Food flavor enhancer composition which may be comprised of a variety or any one of edible salts including sodium chloride, potassium chloride, monosodium glutamate, flavor potentiators and at least one variety of soluble dietary fibers which is preferably decomplexed is specified.

Improved potassium chloride, either alone or in combination with other edible salts together with soluble dietary fibers blended in accordance with the foregoing Examples, produces a composition which is much more similar to sodium chloride than heretofore known and/or possible.

In a preferred form, hypocholesteremic soluble dietary fibers and salt compositions are also specified.

16 Claims, No Drawings

SYNERGISTIC FLAVOR ENHANCEMENT NUTRITIONAL COMPOSITIONS AND METHODS

BACKGROUND OF THE INVENTION

1. Technical Field

The present invention relates to edible food products and methods of manufacture thereof; and, more particularly, to compositions, and methods of manufacture, for enhancing the flavors of foodstuffs to which they are applied while, at the same time, serving to neutralize excess cholesterol in foods consumed as well as serum cholesteol.

The notion that cholesterol intake results in serious specific physiological consequences is currently emerging as popular dogma among the population at large. Seldom has nutritional science seen adoption across such a wide consumer segment of an ever increasing, health conscious public.

The perceived necessity to control or eliminate cholesterol intake is so strong and urgent that long established cultural eating habits are changing abruptly.

Unfortunately, many well established food and agricultural industries are, perhaps unwisely, being radically impacted economically as buying habits of the consumer shift toward implementing food choices which reduce or eliminate cholesterol. Little or no thought has been given to what the consequences of such a radical and sharp change in eating habits might prove to be. The consumers know what they are running away from; but, they apparently do not know what they might be running into. Current medical advice to patients exhibiting numerous medical conditions believed to be influenced by cholesterol to minimize and/or discontinue cholesterol intake and/or medicate with available anticholesteremic agents has authenticated and reinforced this trend.

Highly charged, media-inspired awareness levels have spawned numerous marketing ploys by food producers. These are aimed at capitalizing on some pre-existing absence of cholesterol, or some cholesterol influencing property in old products, primarily via restructured advertising or labeling claims such as ". . . contains NO cholesterol . . . " or ". . . high in fiber . . . ".

Nutritional science has established that some types of dietary fiber, such as hydrocolloids, mucilages, gums and pectins, for example, can not only complex cholesterol contained in foods and thereby reduce its uptake, but even reduce serum cholesterol if taken over a period of time. In addition, it has been known that triglycerides can be reduced by the consumption of gum arabic on a regular basis.

As the following Table I shows, gums do not contain soluble dietary fiber (SDF); but, are essentially soluble dietary fibers themselves. The gums listed in Table I are classed by the FDA as ingredients that may be safely used in foods. For example, pectin is included in the list of permitted additives in standardized foods when a technological need can be proven. In unstandardized foods, the use of pectin is only limited by "good manufacturing practice." See, Pectin Product Bulletin, p. 3, published by A/S KOBENHAVNSPEKTINFABRIK, Copenhagen, Denmark.

TABLE I

| GUM | SOLUBLE FIBERS |
|---|---|
| Pectin | 100% |
| Arabic | 94% |
| Locust bean | 92% |
| Tragacanth | 90% |
| Cellulose | 88% |
| Agar | 85% |
| Xanthan | 85% |
| Alginate | 80% |
| Carrageenan | 78% |

In an opinion paper in response to the increasing interest in fiber levels in foods, the FDA has stated that 30 grams of fiber should be consumed per day (See, Product Data Bulletin entitled "Formulating With Nutriloid Soluble Dietary Fibers", A.01.07, TIC GUMS, p. 1).

Cholesterol is a naturally occurring sterol found in all animal fat. Human metabolism can synthesize cholesterol from almost any food material. The synthesis takes place in most, if not all, cells involved in animal metabolism. The degree of individual synthesis seems to be genetically related since, given the same basic diet, different persons will generate wide variations of serum cholesterol. Clearly, dietary control aimed at reducing intake in itself cannot, in many cases, be expected to be an entirely successful strategy for reduction of hypercholesteremia.

Currently, consumers can take fiber supplements by pill or capsule, obtain a prescription for hypocholesteremic adjuvants (HCA), avoid or restrict foods known to contain cholesterol and consume more high fiber containing foods.

A common guar gum capsule supplement available from health food stores, for example, costs approximately $0.088 per gram of dietary fiber as contrasted with: guar gum at $0.003 per gram; karaya at $0.007 per gram; tragacanth at $0.026 per gram; locust bean at $0.007 per gram; carrageenan at $0.01 per gram; xanthan at $0.002 per gram; arabic at $0.002 per gram; and, CMC at $0.008 per gram.

Many consumers are dissatisfied with new cholesterol reduced diets since many important foods of long standing importance to them—for example dairy products, pork and pork based products, eggs, etc.—are either not available on such diets or available only in limited quantities; and, even then, such products must be prepared in ways not desired by the consumer such as "well done" beef for the devotee of "rare beef". Basic industries, such as the beef industry, cannot change the basic nature of beef or free it of cholesterol.

There have been attempts to interest the poultry industry in new poultry diets which can result in cholesterol reduced poultry and poultry products. The magnitude of these reductions—approximately 40% to 50% reductions in eggs, for example—cannot, at the present time, justify the additional expense for such products. Consequently, the poultry industry continues to face serious declines in sales at various levels.

Food flavor enhancement has been the object of serious study by food specialists since discovery of flavor enhancement properties and the isolation of monosodium glutamate (MSG, $C_5H_8NaO_4$) in 1908. MSG intensifies and enhances flavor while, in quantities normally used, it does not add any flavor of its own. It is this point which differentiates "flavor enhancers" from "seasonings" or "flavor integers" which do serve to add flavors of their own. Salt is a "seasoning", while sugar and common food acids, such as citric acid ($C_6H_8O$) and adipic acid ($C_6H_{10}O_4$), are considered "flavor integers".

There are several theories about how flavor enhancers, integers and potentiators work. Thus, flavor potentiators are believed by some to increase the sensitivity of taste buds. Flavor integers, on the other hand, are synergistic reactants contained in more or less all food, to some degree. Flavor enhancers act as solvents or detergents, freeing more flavors from foods, thus making more flavor available for tasting and assisting flavors in penetrating taste buds more readily. MSG is effective in enhancing flavors of foods in parts per thousand, while other potentiators are capable of enhancing flavor only in parts per billion, or even less.

Moreover, ingestion of food containing MSG has been found to cause headaches and nausea in persons sensitive to it. This reaction, which may be a mild form of allergic anaphylaxsis, has been referred to as "Chinese restaurant syndrome." Flavor potentiators and enhancers improve or amplify flavor beneficially. As far as is known, they are otherwise not very beneficial, or are entirely nonbeneficial, and may, such as with MSG, prove eventually to result in disturbing side effects after consumption.

Prior to the advent of the present invention, flavor enhancer compositions exhibiting additional major nutritional benefits have simply been unknown. However, salt replacers or reducers have been in use for some time. They have not become popular products due to bitter, soapy or chemical tastes perceived by most consumers. Some products have been produced which are combinations of other ingredients, including sodium chloride, in order to minimize this problem. To date, they have met with only moderate success.

2. Background Art

The fields related to food technogy—and, particularly those related to cholesterol, flavor enhancement and the effects of consumption of soluble dietary fibers—are highly crowded and well-developed. Those interested in a typical, but far from exhaustive, bibliography relating thereto are referred, merely by way of example, to the following publications:

1. Martin Glicksman, *Gum Technology In The Food Industry*, Academic Press, Inc., San Diego, pp. 94-505 (1969).
2. A. A. Lawrence, *Edible Gums and Related Substances*, Noyes Data Corporation, Park Ridge, NJ (1973).
3. R. A. A. Muzzarelli, *Natural Chelating Polymers: Alginic Acid, Chitin and Chitosan*, Pergamon Press, Oxford, pp. 23-247 (1973).
4. Roy L. Whistler, *Industrial Gums: Polysaccharides and their Derivatives*, Academic Press, New York, pp. 29-513 (1973).
5. David Kritchevsky, *Hypolipidemic Agents*, Springer-Verlag, Berlin, pp. 29-90, 109-140, 151-182, 216-223, 349-395, 409-414 (1975).
6. Andrew A. Lawrence, *Natural Gums for Edible Purposes*, Noyes Data Corporation, Park Ridge, NJ (1976).
7. Gene A. Spiller and Ronald J. Amen, *Fiber in Human Nutrition*, Plenum Press, New York, pp. 2-6, 9-18, 171-182, 185-267 (1976).
8. Gene A. Spiller and Ronald J. Amen, *Topics in Dietary Fiber Research*, Plenum Press, New York, pp. 105-125 (1978).
9. K. W. Heaton, *Dietary Fibre: Current Developments of Importance to Health*, Technomic Publishing Company, Inc., Westport, CT, pp. 9, 45-75, 97-151 (1979).
10. Heinz A. Hoppe, et al, *Marine Algae in Pharmaceutical Science*, Walter de Gruyter, Berlin, pp. 24, 139, 165, 203, 237, 243, 293, 303, 525, 693, 711 (1979).
11. Roy L. Whistler and Theodore Hymowitz, *Guar: Agronomy, Production, Industrial Use and Nutrition*, Purdue University Press, West Lafayette, IN, pp. 114-117 (1979).
12. Gene A. Spiller and Ruth McPherson Kay, *Medical Aspects of Dietary Fiber*, Plenum Medical Book Company, New York, p. 43-256 (1980).
13. V. J. Chapman and D. J. Chapman, *Seaweeds and their Uses*, Chapman and Hall, London, pp. 62-97 (1980).
14. Robert L. Davidson,*Handbook of Water-Soluble Gums and Resins*, McGraw Hill Book Co., New York, pp. 2-1 -24-1 (1980).
15. Royal College of Physicians of London, *Medical Aspects of Dietary Fibre*, Pitman Medical, Kent, Great Britain, pp. 1-8, 63-159 (1980).
16. U. P. T. James and Olof Theander, *Analysis of Dietary Fiber in Food*, Marcel Dekker, Inc., New York (1981).
17. Martin Glicksman, *Food Hydrocolloids*, Volume I, CRC Press, Boca Raton, FL, pp. 101-124, 127-167 (1982).
18. Glyn O. Phillips, et al, *Gums and Stabilisers for the Food Industry*, Pergamon Press, Oxford, pp. 351-370 (1982).
19. Ivan Furda, *Unconventional Sources of Dietary Fiber*, ACS Symposium Series 214, American Chemical Society, Washington, DC, pp. 1-32, 49-60, 71-104 (1983).
20. Martin Glicksman, *Food Hydrocolloids*, Volume II, CRC Press, Boca Raton, FL, p. 7-190 (1983).
21. Audry Eytons, *The F-Plan Diet*, Bantam Books, NY (1984).
22. Barbara Huff, *Physicians Desk Reference for Non-Prescription Drugs*, Barnhart, Oradell, NJ, pp. 506, 418, 622 (1985).
23. Yeshajahu Pomeranz, *Functional Properties of Food Components*, Academic Press, Orlando, FL, pp. 91-118, 469-471 (1985).
24. Martin Glicksman, *Food Hydrocolloids*, Volume III, CRC Press, Boca Raton, FL, pp. 9-232 (1986).
25. George E. Inglett and S. Ingemar Falkenhag, *Dietary Fibers: Chemistry and Nutrition*, Academic Press, New York, pp. 31, 49, 117, 173, 251.
26. Martin S. Peterson and Lionel H. Johnson, *Encyclopedia of Food Science*, AVI, Westport, CT, pp. 279-287.

Fiber supplements—particularly refined, soluble dietary fibers (SDF) such as pectin (mixture of esterified galacturonan, galactan and araban), sodium alginate ($C_6H_7NaO_6$), karaya gum and guar gum—are expensive and relatively difficult to handle. They are not available in any convenient form for the consumer to use as part of day to day dietary habits; and, even if they were, a particular problem still faced by the consumer would be in judging how much and how to add them to the diet in order to compensate for high cholesterol-bearing foods.

Moreover, SDF's are soluble only in extreme dilution; and, even then will form thick, mucilaginous gels which could result in food sprinkled with gelatinous coated, gritty bits of fiber rendering the food virtually inedible.

Alternatively, if SDF granules were first solubilized for use on food by the addition of water, they would form highly dilute, viscous, slimy coatings similar to thick mucilage, perhaps edible but flavor diluted, and otherwise texturally and hedonically altogether repugnant.

TABLE II
COMPARATIVE VISCOSITY
OF SOME DIETARY FIBERS[1]

| GUM | cP |
|---|---|
| Gum arabic (20% by weight) | 50 |
| Locust bean gum | 100 |
| Methylcellulose | 150 |
| Gum tragacanth | 200 |
| Carrageenan | 300 |
| High viscosity sodium carboxymethylcellulose | 1,200 |
| Gum karaya | 1,500 |
| Sodium alginate | 2,000 |
| Guar gum | 4,200 |

[1]Industrial Gums, Roy L. Whistler, Ed., Academic Press, New York, 1973, p. 316.

An advantage to persons suffering from fluctuations in blood sugar, such as persons prone to hypoglycemia and particularly diabetics who are also concerned with hyperglycemia and hypercholesteremia, is inherent in hypocholesteremic adjuvants of SDF. For example, among other remarkable health giving benefits claimed, guar gum and locust bean gum have been proven to stabilize blood glucose/insulin, referred to as glucose insulin flattening response (GIR).

Though some confusion seems to exist about the benefits of soluble or non-soluble dietary fibers, including a concise definition, global health records clearly demonstrate that in cultures where adequate dietary fiber is consumed, there is an absence, for all practical purposes, of what have come to be known as "rich country" ailments and diseases. The fact that dietary fiber and SDF, in particular, are of major importance not only in maintaining good health but in preventing and even reversing many important serious diseases and health conditions has been known for many years by many in the particular art.

Notwithstanding the need for a convenient food adjunct which can be used routinely by the consumer, no convenient flavor enhancer and dose-related SDF food additive product is at present known to exist. In technologically advanced societies, it is not easy to obtain adequate dietary fiber without major changes in long held cultural eating habits. Supplements of SDF are both expensive and inconvenient to use. No product is known to exist in which the character of soluble fibers is altered so that they are immediately soluble and not mucilaginous, gummy or gritty when applied like table salt directly to food before consumption. Indeed, much of the value associated with SDF products is in their gummy, mucilaginous characteristics.

Scientific research has proven, and continues to prove, the efficacy of hypocholesteremic adjuvant, soluble dietary fibers in altering the progress of many disease states, including diverticulitis, some cancers, cardiovascular disease, arteriosclerotic conditions, and many others, merely by increasing dietary intake above minimum critical limits of many of a wide variety of SDF's. U.S. Pat. No. 3,148,114 entitled: "Method of Reducing Cholesterol Levels", issued to Fahrenbach and Riccardi, discloses, for example, the discovery that thirteen (13) mucilaginous substances exert a powerful hypocholesteremic adjuvant action when consumed in tests by poultry.

Soluble dietary fibers are those substantially polysaccharide or carbohydrate portions of food products, derived essentially from cell wall or biochemical property related constituents of plants, microorganisms and a few animals, which are edible, water soluble and gel forming materials substantially resistant to digestion by enzymes of man; and, are collectively referred to when food is analyzed as dietary fibers. Soluble dietary fibers have essentially no caloric value.

Pectins, agar, guar gum, gum arabic (acacia), bengal, tragacanth, agar, dextran, curdlan, locust bean, tamarind, arabinogalactan (larch gum), shiraz, karaya, tara, ghatti gum and carrageenan, psyllium husks and seed, alginic acids ($C_6H_8O_6$) and many of its salts, xanthan and cellulose ($C_6H_{10}O_5$) derivatives such as carboxymethylcellulose (CMC), methylcellulose, hydroxypropyl methylcellulose are among those SDF's which have proven to be more or less HCA effective.

Included in the definition of SDF's are water soluble mucilages, pectic substances and plant gums, some storage polysaccharides, cellulose derivatives, synthetic gums, and polydextrose. Pectins such as high methoxyl and low methoxyl; gums such as oat, guar, bengal, locust bean, karaya, tara, ghatti, tragacanth, arabic (acacia), quince, sapote, furcelleran, watsonia, tamarind, psyllium, sodium alginate, carrageenan, agar, b-glucans; cellulose such as methylcellulose, carboxymethylcellulose and hemicellulose; microbial gums such as xanthan; mucopolysaccharides; chondroitin sulfate; amino polysaccharides, such as chitin ($C_8H_{13}NO_5$) and chitosan; xylan; propol; polygalturonic acid; and, arabinogalactans are specific, but not exhaustive, examples of a soluble dietary fiber of SDF.

Many soluble dietary fibers have flavor characteristics few of which are pleasant or strong. Their primary applications in foods depend on characteristic functional properties such as emulsification or thickening. They are used almost exclusively in food processing and not by the consumer or directly onto food prior to consumption.

Hydrocolloids are preeminent bearers of SDF's and, in general, are molecularly structured in four configurations:

Linear (Characteristics: usually not more than two copolymerized sugar units; high viscosity; unstable solutions; difficult to dissolve; risk of precipitation after dissolution—gelation. Examples are: cellulose, amylose, pectin, carrageenan, agar, alginate).

TABLE III

Linear
— — — — — — — — — — — — —

Single Branch (Characteristics: sugar units condensed with carbon groups other than C-1 or C-4. Example is: dextran).

TABLE IV

Single Branch

TABLE IV-continued

Substituted Linear (Characteristics: numerous short branches often consisting of only one sugar unit in length. Examples are: locust bean gum, guar gum).

TABLE V

Substituted Linear

Branch on Branch (Characteristics: side chains on side chains; more stable and less viscous than linear. Typically, two or more types of sugar make up the polysaccharide. Excellent adhesive properties. Examples are: amylopectin, gum arabic).

TABLE V

Branch on Branch

There does not seem to be any relationship between the configuration of the particular soluble dietary fiber and its flavor amplification capabilities.

SUMMARY OF THE INVENTION

Common table salt (sodium chloride), common salt replacer (potassium chloride), and monosodium glutamate (MSG) are known as "seasonings". MSG is also known as a "flavor enhancer" and a "flavor potentiator". However, it has been found in the practice of the present invention that when any of the foregoing are combined with one or more SDF's and used like normal table salt on food, the food flavors are immediately enhanced. Yet, there is no known use of SDF's as "flavor enhancer"; and, in and of themselves, they are not.

More specifically, it has been discovered that when soluble dietary fibers are combined with edible salts, such as common table salt, salt replacer, MSG and/or flavor potentiators, and then are used like common table salt on foods, the food becomes instantly more flavorful than when treated with edible salts alone, retaining more natural juiciness and moistness. An SDF/salt composition embodying features of the present invention does not, in normal use levels, impart any additional flavor to the food but, rather, amplifies and enhances natural flavors inherent in the food. The composition so formed does not, as expected, impart gummy, gritty, mucilaginous or slimy textures to food salted with it.

Preferred SDF's, alone or in combination, are pectin, guar, karaya, locust bean, sodium alginate, tara and oat gums.

It is a primary objective of the present invention to produce compositions which, when used like salt on foodstuffs, significantly and strikingly enhance the natural flavor, juiciness and palatability thereof.

It is an important objective to achieve flavor, juiciness and palatability enhancement without otherwise adversely affecting any other organoleptic qualities of treated food.

An additional object is to provide flavor enhancing compositions which are based on materials known to be safe and beneficial to eat and without known adverse health effects.

A further object is to provide flavor, juiciness and palatability enhancers which may provide important health benefits.

A particular object is to provide flavor, juiciness and palatability enhancers which include, as an important component of their composition, soluble dietary fiber in a form convenient for consumer use.

A specific object is to provide flavor enhancement compositions which amplify salty flavors, resulting in lower use levels of salt by the user.

A particular object is to provide a product which is inexpensive to manufacture.

Another specific object is to provide a product which may utilize crude extracts of soluble dietary fibers as a major economy.

Another object is to provide compositions wherein selected salts and soluble dietary fibers are in appropriate ratio to provide significant routine dietary contribution of important soluble dietary fibers when food is salted therewith to average taste.

It is another object of the present invention to produce an HCA/GIR effective SDF/salt and/or salt substitute composition which, when used to salt cholesterol-bearing foods to average salt taste, can result in significant bypass of consumed cholesterol, and even reduction in metabolically generated serum blood cholesterol, dependent, of course, on the conditions under which the foodstuff is prepared and/or other of a myriad of considerations applicable to the broad field of food chemistry.

It is an additional objective to use combinations of soluble dietary fibers which, when combined with a selected salt, salt combination and/or other flavor potentiator, may become more readily soluble such that, when used on foodstuffs in a manner similar to common table salt, they do not form unpleasant, characteristic gummy, gritty, mucilaginous masses.

A specific object of the present invention is reduction of minimum daily requirements of SDF by specific application to high cholesterol-bearing foodstuffs before consumption thereof rather than non-specific dosing by supplementary SDF bolus or necessity of abstaining from traditional foods in order to eat fiber rich foods.

A particular object is to produce a salt replacer product based on the use of potassium chloride [which, itself, does not taste like salt (sodium chloride)], yet wherein the resulting salt replacer product: i) does taste like natural salt (sodium chloride); ii) is not bitter, astringent, chemical or soapy tasting; and iii), has a pleasant, salty aftertaste when eaten alone or as a part of foods.

Products produced according to the present invention may combine common table salt, common table salt replacers, flavor enhancer salt, including MSG and flavor potentiators, and soluble dietary fiber and combinations thereof into a dried, granulated table salt flavor enhancer composition.

Salt and/or salt substitutes, such as potassium chloride, and/or flavor enhancing or potentiating salts, such as monosodium glutamate, and ibotenic acid ($C_5H_6N_2O_4$), tricholomic acid, guanosine 5'-monophosphate (GMP) ($C_{10}H_{14}N_5O_8P$), xanthosine 5'-monophosphate, 5'-inosinate, 5'-luanylate, 5'-neuclotides, maltol ($C_6H_6O_3$), dioctyl sodium sulfosuccinate ($C_{20}H_{37}NaO_7S$), N,N'-di-o-tolylethylenediamine, cyclamic acid ($C_6H_{13}NO_3S$) and the like, may be combined with soluble dietary fibers which are frequently and preferably decomplexed to improve solubility and reduce usually expected functional characteristics, such as rheological properties otherwise disagreeably encountered when regular unrehydrated soluble dietary fibers are applied directly to food prior to consumption.

A major effect of combining soluble dietary fibers and at least one of seasoning salts, flavor amplifying salts and potentiators into a composition results in heretofore unknown flavor enhancement of foods to a degree much greater than expected from the sum of the components and, in the case of soluble dietary fibers, an entirely unexpected and heretofore unknown benefit.

The SDF/salt or SDF/salt/flavor potentiator or SDF/flavor potentiator ratio may be adjusted to yield a table salt product which, when added directly to cholesterol rich food such as steak, pork, hamburger, poultry, bacon, ribs or eggs, will reduce the point of average saltiness range from about 0.25%-1% to about 0.15%-0.5% because the perceived flavors will be more acutely noticeable as a result of flavor enhancement (See, Comparative Sensory Evaluation Tests below). The ratio of SDF/salt may be adjusted to provide a sufficient concentration of SDF at reduced average salting levels in order to provide significant contributions to daily SDF intake. This is particularly important since it can be applied at points of specific cholesterol rich ingestion, thereby positively influencing reduction of specific ingested cholesterol and, over a long period of similar use, perhaps even yield serum cholesterol reductions in the consumer.

It is anticipated that convenient, routine applications by the consumer of SDF/salt flavor enhancers to cholesterol rich food may result in reduced daily minimum fiber requirements and provide a wider range of food options by the cholesterol conscious consumer to select more desirable traditional foods rather than less desirable fiber supplement foods.

COMPARATIVE SENSORY EVALUATION TESTS[2]
Score: 1 to 10 Points
(1-3: Unacceptable; 4-6: Average; 7-10: Excellent)

TEST NO. 1

| 9 Persons<br>Sirloin steak,<br>6-oz., broiled | Appearance | Taste | Flavor | Juiciness | Mouth-feel Bite/Body |
|---|---|---|---|---|---|
| No salt or flavorings | 75 | 26 | 35 | 51 | 60 |
| Salt, .6% | 72 | 55 | 63 | 40 | 52 |
| SDF/salt, 50%/50%-.6% | 75 | 81 | 79 | 85 | 70 |

Total Possible Score, All Factors: 9 × 10 × 5 = 450
TOTAL SCORE: No Salt - 247;
Salt .6% - 282;
SDF/Salt - 390.

COMPARATIVE SENSORY EVALUATION TESTS[2]
Score: 1 to 10 Points
(1-3: Unacceptable; 4-6: Average; 7-10: Excellent)

TEST NO. 2

| 12 Persons<br>Tomato, sliced<br>Beefsteak, 4 slices | Appearance | Taste | Flavor | Juiciness | Mouth-feel Bite/Body |
|---|---|---|---|---|---|
| No salt or flavorings | 88 | 51 | 63 | 60 | 78 |
| Salt, .6% | 103 | 82 | 89 | 65 | 74 |
| SDF/salt, 50%/50%-.6% | 91 | 110 | 104 | 105 | 105 |
| MSG/salt 25%/75% Total add .6% | 89 | 96 | 99 | 86 | 95 |

Total Possible Score, All Factors: 12 × 10 × 5 = 600
TOTAL SCORE: No Salt - 340;
Salt .6 - 433;
SDF/Salt - 515.

TEST NO. 3

| 11 Persons<br>Fish, Halibut,<br>Broiled steak,<br>6 ozs. | Appearance | Taste | Flavor | Juiciness | Mouth-feel Bite/Body |
|---|---|---|---|---|---|
| No salt or flavorings | 85 | 64 | 51 | 70 | 75 |
| Salt, .6% | 87 | 83 | 80 | 61 | 64 |
| SDF/salt, 50%/50%-.6% | 82 | 103 | 100 | 103 | 92 |

Total Possible Score, All Factors: 11 × 10 × 5 = 550
TOTAL SCORE: No Salt - 345;
Salt, .6% - 375;
SDF/Salt - 480.

TEST NO. 4

| 12 Persons<br>Vegetable Soup,<br>8-oz. bowl<br>(no thickeners used) | Appearance | Taste | Flavor | Juiciness | Mouth-feel Bite/Body |
|---|---|---|---|---|---|
| No salt or flavorings | 88 | 75 | 72 | | 75 |
| Salt, .6% | 85 | 83 | 87 | | 85 |
| SDF/salt, 50%/50%-.6% | 85 | 94 | 91 | | 90 |

Total Possible Score, All Factors: 12 × 10 × 4 = 480
TOTAL SCORE: No Salt - 310;
Salt .6% - 340;
SDF/Salt - 360.

TABLE NO. 5

| 11 persons<br>Potato chips,<br>1 oz. | Appearance | Taste | Flavor | Juiciness | Mouth-feel Bite/Body |
|---|---|---|---|---|---|
| No salt or flavorings | 69 | 50 | 41 | 45 | 70 |
| Salted (typical commercial brand) | 75 | 68 | 70 | 72 | 70 |
| SDF/salt, 50%/50% | 68 | 71 | 70 | 71 | 75 |

Total Possible Score, All Factors: 11 × 10 × 5 = 550
TOTAL SCORE: No Salt - 275;
Salt, typical - 355;

| -continued |
|---|
| COMPARATIVE SENSORY EVALUATION TESTS[2] |
| Score: 1 to 10 Points |
| (1-3: Unacceptable; 4-6: Average; 7-10: Excellent) |
| SDF/Salt - 355. |

[2]The comparative Sensory Evaluation Tests herein described represent sensory evaluations by random groupings of from seven (7) to twelve (12) of fourteen (14) adults. The tests were conducted over a three (3) day period. Each participant was asked to evaluate the food sample being tested in a total of up to five (5) different sensory categories-viz.,,
i appearance;
ii taste;
iii flavor;
iv juiciness (not used in the case of liquid foodstuffs such as soups);
and v, mouth-feel or bite and body-
and to assign a score to each category ranging from "1" (unacceptable or disliked) to "10" (excellent or most liked).

As indicated in Footnote 2, supra, the foregoing tests represented evaluations by fourteen (14) different persons over a 3-day test period. Nine (9) of the participants were adult females, and five (5) were adult males. The SDF/salt used was that produced in accordance with Formula EXAMPLE 4, infra. The total actual salt used, as applied with SDF/salt, was 50%—i.e., the composition comprised 50% by weight salt and 50% by weight soluble dietary fiber. On potato chips, however, both for regular salt and SDF/salt, the amount was whatever adhered to the chip; or, approximately the amount used on typical consumer potato chips.

The test results reflect test subject preferences. All samples were blind tested, having been assigned designated numbers corresponding to test records which were imprinted on the bottom of the food container. Results were recorded by an interviewer. Unsalted foods scored a total of 59% of a perfect score; food salted to 0.6% scored 69% of a perfect score; while foods salted with an SDF/salt composition embodying the present invention and applied at a concentration of 0.6% [equal to approximately 0.3% salt or approximately one-half (½) the total salt required when salt is used alone] scored 84% of a perfect score.

The preference for SDF/salted food was particularly noticeable with respect to the chemical sense factors—i.e., taste and flavor—but, the most surprising results were perception of juiciness over that of normally salted and unsalted foods. This may be attributable to the fact that salt alone tends to shrink protein, causing it to dewater, while SDF's water holding capacity, which is well known, may, at least in this case, result in retention of juiciness preferentially over salt.

All soluble dietary fibers tested have shown the surprising ability to amplify or synergize amplification of flavor when used in conjunction with, and as part of, a composition containing at least one of common table salt, salt substitute, MSG or flavor potentiator.

Many SDF's are available in granular or powdered form. They form a wide variety of viscous solutions with water. These solutions are frequently and aptly described as mucilaginous—that is, slimy and thick to the touch. They are characterized by being formed at relatively low concentrations of fiber solid to solute—i.e., on the order of 0.25% to 1%, fiber/solute.

SDF's may react with other SDF's to destroy or partly destroy all or some of mutual gel forming function. When added together, they act anti-synergistically, both losing thickening power, forming only thin pouring, non-viscous, non-mucilaginous, non-slimy solutions, even in very high concentrations. Gel forming properties are a primary value characteristic of SDF's; and, in normal food processing, due to the expense of SDF's, destruction or degradation of gel forming or thickening properties, whatever the reason, are avoided at all costs.

When in the granular form, SDFs may be dispersed in water by aggressive agitation and good dispersion of powder while agitating. When not dispersed well, or when wetted in larger quantities, they clump together and will not then readily disperse. If merely sprinkled dry onto a moist or wet surface, the outer contact surface displays greedy, hygrophillic character and sorbs up all surface moisture so tightly that the underlying areas are capsulated and remain dry unless mechanically disrupted in some fashion.

Due to the extremely small concentrations of flavor potentiator normally required to enhance flavor, and because of the advantages generally associated with the presence of salt or salt substitutes in terms of dispersion of SDF/salt, it is preferred that flavor potentiators be incorporated with salt, salt substitutes and/or MSG in SDF/salts.

DETAILED DESCRIPTION

HCA SDF may be distributed in water by a recirculating pump or other means to form a highly concentrated slurry. It may then be mixed with a high concentration of a table salt—e.g., sodium chloride and/or salt substitute materials such as potassium chloride and/or MSG and/or flavor potentiators—in a vertical dough mixer to form a thick pasty dough. The dough may be rolled out, then dried by desiccation, lyphilization, forced air or any other type of non-SDF destructive heating; and, the resulting crystal granulated or powdered into SDF/salt by grinding such as in an attrition mill.

The resultant product may be used as SDF/salt for flavoring soups, stews or gravies and applied directly to food prior to consumption.

For some food applications, the composition may be somewhat slow to rehydrate due to surface phenomenon as explained earlier and in general it is preferred that SDF be decomplexed at least to some extent in order to compensate for this problem. This can be done by a variety of means. Alginates and salts of alginic acid, which normally form viscous fluids at low concentrations, lose this property in the presence of high salt concentrations, and display little or no viscosity at all. This permits extremely high concentrations of salt and alginate to be added together with a minimum of water. The end product, though in small granules, will combine with water immediately and perform on food in a fashion very similar to salt by itself. This permits ready addition by salting with SDF/salt to moist food surfaces prior to consumption, such as to the surface of a cooked hamburger or steak.

When alginate and gum arabic (acacia) or xanthan and gum arabic are combined, they react with each other losing most or all of their viscosity forming properties. In combination with salt or salt substitutes, combinations of alginate, xanthan and gum arabic may be added together in high concentrations and will act similarly to salt by itself when sprinkled onto food. The addition of many gums to form the SDF/salt composition in itself results in changing rheology for more practical use on food as a salt. Like many gums, viscosity imparted by cellulose gum will be depressed if the gum is added dry to a salt solution. Since salt is very soluble in water, when a composition containing gums such as alginate or cellulose are added to a moist food, a salt solution is first formed, immediately resulting in lowered viscosity.

The mixture of salt with crude algae, such as minced Macrocystis integrifolia, permits the easy and inexpensive removal of the alginic acid via similar breakdown chemistry involved with the salt addition.

Homogenizing or chopping, pressing or filtering or centrifuging result in a salt/algin composition which, with adequate filtration, drying and grinding, is suitable as a SDF/salt composition or as a base material for additions of other SDF's or salts.

Tara gum and algin react in somewhat analogous fashion to gum arabic and algin and may be used in similar fashion for making SDF salt compositions.

Almost any SDF or SDF combination may be used since the flavor enhancing quality of SDF when combined with salt, salt substitute and flavor potentiators results from any of those combinations mentioned. Altered functional qualities of the finished SDF combination, such as rapid solubility or reduced viscosity, is obtained by judicious selection of combinations such as Formula EXAMPLE 4, infra, or by combining a substantial portion of SDF's, which are decomplexed by salt, with salt. The following are some examples of effective SDF salt compositions:

| EXAMPLE 1 | |
|---|---|
| Sodium alginate | 3 Parts |
| Pectin | 3 Parts |
| Sodium chloride | 4 Parts |
| | 10 Parts |

Procedure: Mix dry ingredients together in a vertical dough mixer such, for example, as a Hobart 10-quart dough mixer; and, blend with an equal part of water. Form dough; mix until salt is all dissolved. Remove. Dry on forced air dryer at 1,350 degrees F. until 7% to 8% moisture. Break up cake formed and feed into an attrition mill such as EUROMILL TM (a registered trademark of R. Frinuodt Pedersen of Daugard, Denmark) to make granules between 100 and 160 mesh size.

| EXAMPLE 2 | |
|---|---|
| Guar gum | 4 Parts |
| Sodium alginate | 2 Parts |
| Karaya gum | 2 Parts |
| Potassium chloride | 3 Parts |
| Sodium chloride | 5 Parts |
| | 16 Parts |

Procedure: In a blender, mix all three gums in 200 parts water. Add all sodium and potassium chloride. Force air pan dry at 125 degrees F. Break into pieces and grind into salt granules of 100 to 160 mesh.

| EXAMPLE 3 | |
|---|---|
| M. integrifolia | 90 Parts |
| Sodium chloride | 30 Parts |
| | 120 Parts |

Procedure: Wash harvested M. integrifolia; add salt and then chop to thick slurry in food chopper (bone and meat chopper). Add slurry to a mixing tank. Stir for 2 hours at ambient temperature. Press through a filter. Filter again, then dry on rotating drum heated to 180 degrees F. and flake off surface. Grind to salt sized granules, 120 to 180 mesh. Optionally, press liquid may be charcoal filtered or treated with oxidation agent such as oxygen ($O_2$), hydrogen peroxide ($H_2O_2$) or sulfur dioxide ($SO_2$) to deodorize and de-color.

| EXAMPLE 4 (Small Batch) | |
|---|---|
| Sodium chloride | 600 gms. |
| Karaya gum | 125 gms. |
| Pectin (high methoxy) | 125 gms. |
| Guar | 125 gms. |
| Sodium alginate | 225 gms. |
| | 1,200 gms. |

Procedure: In a standard vertical dough mixer add 2,500 mls. of water and all of the salt. Mix 5 to 10 mintues until salt is dissolved. Add sodium alginate and karaya gum. Blend at fast speed with a wire whip until a thick, brown syrup is formed. Add balance of pectin and guar gum, forming thick dough. Mix using dough hook until salt is completely dissolved and dough is smooth and pliable. Set to dry in stackable food dryer making layers about 1 inch thick. Dry at medium heat (120 to 130 degrees F.) at approximately 75 feet per minute of air flow across product until moisture content is less than 10%.

When dry, break up sheets into clumps and grind through a stone mill set for 100 to 150 mesh.

| EXAMPLE 5 | |
|---|---|
| Sodium chloride | 30 parts |
| Monosodium glutamate | 30 parts |
| Karaya gum | 20 parts |
| Tara gum | 10 parts |
| Chitosan | 8 parts |
| Maltol | 1 part |
| | 100 parts |

Procedure: Utilize the same procedure as described above for EXAMPLE 4; except, that sodium chloride and monosodium glutamate are first added, and then the other ingredients in the order shown.

| EXAMPLE 6 | |
|---|---|
| Sodium chloride | 20 parts |
| Potassium chloride | 35 parts |
| Cyclamic acid | 1 part |
| Adipic acid | 1 parts |
| Guar gum | 10 parts |
| Psyllium | 5 parts |
| Carrageenan | 8 parts |
| Agar | 20 parts |
| | 100 parts |

Procedure: The same procedure as for EXAMPLE 4, except that sodium chloride, potassium chloride, cyclamic acid and adipic acid are first added and then the other ingredients, in the order shown.

| EXAMPLE 7 | |
|---|---|
| MORTON's Lite Salt TM [3] | 1,244 parts |
| Sodium alginate | 700 parts |
| Guar gum | 150 parts |
| Gum arabic | 150 parts |
| Tara gum | 50 parts |

-continued
EXAMPLE 7

2,294 parts

Procedure: In a vertical dough mixer container, add 1,500 parts water and 1,244 parts MORTON's Lite Salt TM. Mix with wire whip on low for 10 minutes. Add sodium alginate and gum arabic (acacia). Mix with wire whip on medium 5 minutes. Add guar gum. Use dough hook and mix 5 to 10 minutes. Remove dough from mixer, break into apricot-sized nuggets and place on drying surface of food dehydrator. Set dehydrator for medium heat (about 125 degrees F.) and dry until moisture content is 3% to 4% (about 12 hours). In stone mill, grind salt to 150 to 200 mesh granules. If desired, approximately 5 parts of calcium oxide or other edible whitening pigment may be optionally added to whiten the end product.

The high potassium content of Lite Salt TM results in abnormal organoleptic properties when it is evaluated by a sensory panel. Though it displays a taste best characterized by the term "salty," it also results in additional flavor referred to as a "soapy" or "bitter" aftertaste. The foregoing formula somehow cancels or interferes with the undesirable taste quality accompanying potassium chloride. When tested on tomatoes and meat, seven (7) testers (3 female and 4 male) could not tell the difference between the SDF/salt of EXAMPLE 7 and regular salt (sodium chloride).

The formula for MORTON's Lite Salt TM (U.S. Pat. No. Re. 27,981) as set forth on the package is:
  Salt NaCl
  Potassium chloride
  Sodium silicoaluminate ($Na_2O:Al_2O_3:SiO_2$)
  Magnesium carbonate ($MgCO_3$)
  Dextrose ($C_6H_{12}O_6$)
  Potassium iodide The proportions of substances are unknown not set forth on the packaging; but, are shown as they as listed on the MORTON's Lite Salt TM label.

EXAMPLE 8

| MORTON'S Salt Substitute | 1,244 parts |
| --- | --- |
| Sodium alginate | 700 parts |
| Guar gum | 150 parts |
| Gum arabic | 150 parts |
| Tara gum | 50 parts |
|  | 2,294 parts |

Procedure: In a vertical dough mixer container, add 3,483 parts water (2.8 times the amount of salt) and 1,244 parts MORTON's Salt Substitute. Mix with wire whip on low for 10 minutes. Add sodium alginate and gum arabic (acacia). Mix with wire whip on medium 5 minutes. Add guar gum. Use dough hook and mix 5 to 10 minutes. Remove dough from mixer, break into apricot-sized nuggets and place on drying surface of food dehydrator. Set dehydrator for medium heat (about 125 degrees F.) and dry until moisture content is 3% to 4% (about 12 hours). In stone mill, grind salt to 150 to 200 mesh granules. As in the case of EXAMPLE 7, approximately 5 parts of calcium oxide or other edible whitening pigment may be optionally added to whiten the end product.

As in the case of EXAMPLE 7, the high potassium content present in MORTON's Salt Substitute resulted in abnormal organoleptic properties when it was evaluated by a sensory panel. Though it also displays a taste best characterized by the term "salty, " it, too, results in additional flavor, referred to as a "soapy" or "bitter" aftertaste. However, the foregoing formula again cancels or interferes with the undesirable taste quality accompanying potassium chloride. When tested on tomatos and meat, 7 testers (3 female and 4 male) could not tell the difference between the SDF/salt of EXAMPLE 8 and regular salt (sodium chloride). The formula for MORTON's Salt Substitute (U.S. Pat. No. 3,505,082) as set forth on the package is:
  Potassium chloride
  Sodium silicoaluminate
  Magnesium carbonate
  Dextrose
  Potassium iodide The proportions of substances used are not set forth on the packaging; but, are shown as they as listed on the MORTON'S Salt Substitute label.

CHART FOR LITE SALT

| Tomato, Beef Steak | Flavor Average Score | Bitterness Average Score |
| --- | --- | --- |
| Salt, .5% | 56 | 0 |
| MORTON'S Lite Salt TM | 56 | 35 |
| SDF/MORTON's Lite Salt TM | 49 | 0 |
| No salt | 28 | 0 |
| MORTON'S Salt Substitute (potassium chloride) | 21 | 63 |
| SDF/MORTON's Salt Substitute (Potassium chloride) | 56 | 7 |

| Steak, sirloin type, 4 ozs. | Flavor Average Score | Bitterness Average Score |
| --- | --- | --- |
| Salt, .5% | 63 | 0 |
| MORTON'S Lite Salt TM | 35 | 28 |
| SDF/MORTON's Salt Substitute (potassium chloride | 63 | 0 |
| No salt | 35 | 0 |
| MORTON'S Salt Substitute (potassium chloride) | 14 | 56 |
| SDF/MORTON's Salt Substitute (potassium chloride) | 63 | 21 |

Average Score: 7 persons, 4 female, 3 male

SDF/MORTON's Salt Substitute composition used in the foregoing tests was formulated according to EXAMPLE 8. The results show that when combined in the SDF/MORTON's Salt Substitute composition, the bitter chemical taste of potassium chloride is moderated to a taste very close to that of regular salt while the flavor is significantly enchanced.

What is claimed is:

1. A flavor enhancing composition for human food comprised of an edible salt selected from the group consisting of sodium chloride, potassium chloride, and monosodium glutamate, and granulated or powdered dietary fiber, said composition being in granular or powder form suitable for application to a human food prior to consumption.

2. A composition as defined in claim 1 wherein the dietary fiber is selected from soluble dietary fibers.

3. A composition as defined in claim 1 further comprising at least one flavor enhancer or flavor integer selected from the group consisting of ibotenic acid, tricholomic acid, guanosine 5'-monophosphate, xanthosine 5'-monophosphate, 5'-inosinate, 5'-luanylate, maltol, dioctylsodium sulfosuccinate, N,N'-di-o-tolylethylenediamine and cyclamic acid.

4. A composition as defined in claim 2 wherein the dietary fiber selected is hypocholesteremic effective.

5. A composition as defined in claim 2 or 4 wherein the dietary fiber is selected from the group consisting of arabic gum, algin, bengal, locust bean, tara, karaya, guar, oat, ghatti, quince, sapote, watsonia, tamarind, psyllium, tragacanth, xanthan, furcelleran, dextran, chondroitin sulfate, chitosan, xylan, propol, carrageenan, agar, and pectin.

6. A composition as defined in claim 3 wherein the edible salt is comprised of potassium chloride.

7. A composition as defined in claim 2 wherein the soluble dietary fibers are decomplexed.

8. A composition as defined in claim 2 wherein the salt is substantially a mixture of sodium chloride and potassium chloride.

9. A method to reduce cholesterol in the human body of a subject by adding the hypocholesterolemic adjuvant/salt composition defined in claim 4 to cholesterol containing foodstuffs prior to consumption thereof by said subject.

10. A method of reducing assimilable cholesterol in the human body which comprises adding the composition defined in claim 4 containing a sufficient proportion of hypocholesteremic dietary fiber to salt such that when food is salted to average taste and ingested by a human a significant portion of cholesterol contained in the food is not assimilated.

11. A method of lowering cholesterol in the human body which comprises adding the composition defined in claim 4 containing a sufficient proportion of hypocholesteremic adjuvant to salt such that when food is salted or flavored to average taste and ingested by a human a significant portion of serum blood cholesterol is reduced.

12. A method of flavoring food comprising treating food with a powder or granular composition comprised of edible salt and a dietary fiber.

13. A method of flavoring food by treating it with the composition defined in claim 2 wherein the salt is selected from sodium chloride, potassium chloride and monosodium glutamate.

14. A method of making the composition defined in claims 1, 2, 3, 4, 5, 6, 7, or 8 comprising:
a) dissolving an edible salt in water to make a salt solution;
b) adding dietary fiber to the salt solution to make a slurry or dough;
c) mixing the slurry or dough until the slurry or dough is homogenous;
d) drying the slurry or dough at a temperature nondestructive to the dietary fiber; and,
e) grinding the dried slurry or dough into granules or a powder which can be sprinkled.

15. A composition as defined in claim 1 wherein the soluble dietary fiber is comprised of a mixture of gum arabic and alginate or gum arabic and xanthan.

16. A method for enhancing the juiciness of food comprising treating food with a composition defined in claim 1.

* * * * *